(12) United States Patent
Blanchard et al.

(10) Patent No.: US 7,475,547 B2
(45) Date of Patent: Jan. 13, 2009

(54) CONVERGENT TURBOJET EXHAUST NOZZLE

(75) Inventors: Stephane Pierre Guillaume Blanchard, Chartrettes (FR); Thibault Marie-Jacques Arnold, Fontainebleau (FR)

(73) Assignee: SNECMA, Paris (FR)

( * ) Notice: Subject to any disclaimer, the term of this patent is extended or adjusted under 35 U.S.C. 154(b) by 545 days.

(21) Appl. No.: 11/188,739

(22) Filed: Jul. 26, 2005

(65) Prior Publication Data

US 2006/0213199 A1 Sep. 28, 2006

(30) Foreign Application Priority Data

Jul. 28, 2004 (FR) ................................. 04 08335

(51) Int. Cl.
*F02K 1/00* (2006.01)
(52) U.S. Cl. ................ 60/771; 239/265.39; 239/265.19
(58) Field of Classification Search .................. 60/770, 60/771; 239/265.19, 265.39
See application file for complete search history.

(56) References Cited

U.S. PATENT DOCUMENTS

| | | | |
|---|---|---|---|
| 3,837,580 A * | 9/1974 | Camboulives et al. .. | 239/265.39 |
| 3,873,027 A * | 3/1975 | Camboulives et al. .. | 239/265.33 |
| 4,541,567 A | 9/1985 | Jourdain et al. | |
| 4,637,550 A | 1/1987 | Nash | |
| 5,034,172 A | 7/1991 | Vives et al. | |
| 5,232,158 A * | 8/1993 | Barcza ................... | 239/265.35 |
| 5,584,173 A * | 12/1996 | Lybarger ..................... | 60/797 |
| 5,676,312 A | 10/1997 | Lapergue et al. | |
| 5,839,663 A * | 11/1998 | Broadway et al. ...... | 239/265.35 |
| 6,148,608 A * | 11/2000 | Martin et al. ................ | 60/232 |
| 7,117,682 B1 | 10/2006 | Sevi et al. | |
| 2005/0116061 A1 * | 6/2005 | Carper ................... | 239/265.37 |

FOREIGN PATENT DOCUMENTS

| | | |
|---|---|---|
| EP | 0 100 697 A1 | 2/1984 |
| EP | 0 364 360 A1 | 4/1990 |
| EP | 0 697 514 A1 | 2/1996 |
| EP | 0 750 107 A1 | 12/1996 |
| EP | 1 517 032 A1 | 3/2005 |

* cited by examiner

*Primary Examiner*—Devon C Kramer
*Assistant Examiner*—Andrew Nguyen
(74) *Attorney, Agent, or Firm*—Oblon, Spivak, McClelland, Maier & Neustadt, P.C.

(57) ABSTRACT

A convergent turbojet exhaust nozzle comprising a ring of hinged flaps made up of controlled flaps and of follower flaps disposed in alternation and co-operating at their upstream ends with a peripheral sealing gasket arranged at the outlet from an afterburner channel, each flap being made out of a ceramic-matrix composite material, and at its upstream end, each flap being made integrally with bearing means for bearing against the above-mentioned peripheral gasket, and with spherical-joint means between their upstream ends.

17 Claims, 4 Drawing Sheets

CONVERGENT TURBOJET EXHAUST NOZZLE

The present invention relates to a convergent turbojet exhaust nozzle formed at the outlet from an afterburner channel by a ring of hinged flaps comprising controlled flaps disposed in alternation with follower flaps.

BACKGROUND OF THE INVENTION

The flaps can occupy a position in which they substantially extend the wall of the afterburner channel, and a position in which they are inclined relative to the axis of the afterburner channel so as to increase thrust.

The flaps, which are metal in the prior art, come into contact with the high-temperature gas leaving the afterburner of the turbojet, and as a result they have a relative short lifetime that could be increased by making the flaps out of a material that withstands high temperatures better, e.g. a ceramic-matrix composite material (CMC), which material would also reduce the weight of the flaps without substantially increasing their cost.

However, mounting hot flaps of CMC material in a convergent exhaust nozzle of the above-mentioned type poses the problem of sealing between the flaps at the peripheral gasket arranged at the outlet from the afterburner channel: the flaps of CMC material are several times thicker than metal flaps, and as a result of their layered sheet structure, they cannot have a small radius of curvature in the join zones between adjacent flaps. This results in relatively large leakage sections in the join zones through which afterburner gas can escape, thereby reducing the amount of thrust provided in afterburner mode.

In addition, it would not be satisfactory to equip the flaps of CMC material with metal portions at their ends that co-operate with the above-mentioned peripheral gasket because of the differential thermal expansion between the metal portions and the composite material.

OBJECTS AND SUMMARY OF THE INVENTION

A particular object of the invention is to provide a simple, low cost, and effective solution to this problem.

The invention provides a convergent turbojet exhaust nozzle having hot flaps of CMC material, without large leakage sections at the joins between the flaps at the peripheral sealing gasket arranged at the outlet from the afterburner channel.

To this end, the invention proposes a convergent turbojet exhaust nozzle comprising a ring of hinged flaps made up of controlled flaps and of follower flaps disposed in alternation and co-operating at their upstream ends with a peripheral sealing gasket arranged at the outlet from an afterburner channel, wherein each flap is made out of a ceramic-matrix composite material, and each flap is made integrally with bearing means at its upstream end for bearing against the above-mentioned peripheral gasket, and with sealing means providing longitudinal sealing between flaps.

At its upstream end, each flap is also made integrally with hinge means pivotally connected to the upstream ends of the adjacent flaps. This makes it possible to reduce the leakage sections at the joins between the adjacent flaps, and therefore makes it possible to prevent or to reduce the leakage of afterburner gas at said joins.

Each of the controlled flaps and each of the follower flaps is thus made integrally as a single piece with its bearing means for bearing against the sealing gasket, its longitudinal sealing means, and its pivot hinge means. The number of parts used to make the convergent exhaust nozzle of the invention is therefore small. The flaps are made entirely out of ceramic-matrix composite material, thereby reducing the weight of the exhaust nozzle.

The above-mentioned pivot hinge means are preferably spherical-joint means.

In a preferred embodiment of the invention, the upstream end of each flap includes a circularly-cylindrical portion that is oriented transversely relative to the axis of the exhaust-nozzle, and tangentially relative to the peripheral gasket, and having a convex cylindrical surface that bears against the peripheral gasket. The lateral ends of the circularly-cylindrical portion are shaped into spherical portions and form hinge means pivoted on the adjacent flaps. The spherical portions formed at the upstream ends of the controlled flaps constitute balls, for example, and the spherical portions formed at the upstream ends of the follower flaps are sockets receiving the spherical portions of the controlled flaps.

Longitudinal sealing between the flaps is achieved by the controlled flaps bearing against the longitudinal edges of the follower flaps, the longitudinal edges having a convex curved shape in cross-section.

Longitudinal sealing between the hinged flaps is thus provided in simple manner by the flaps themselves. The convex curved shape of the longitudinal edges of the follower flaps makes it possible to limit wear caused by the flaps rubbing against one another, with rubbing taking place on the top layers of the follower flaps.

In some circumstances, the peripheral sealing gasket is made out of ceramic-matrix composite material so as to avoid the problems of wear on tilting the flaps towards the axis of the exhaust nozzle, when the cylindrical upstream portions of the flaps rub against the sealing gasket.

In order to further reduce wear caused by the flaps rubbing, said flaps may be coated at least part in an anti-abrasion coating at their upstream ends and along their longitudinal edges.

BRIEF DESCRIPTION OF THE DRAWINGS

Other advantages and characteristics of the invention appear on reading the following description given by way of non-limiting example and with reference to the accompanying drawings, in which.

MORE DETAILED DESCRIPTION

Figure 1:
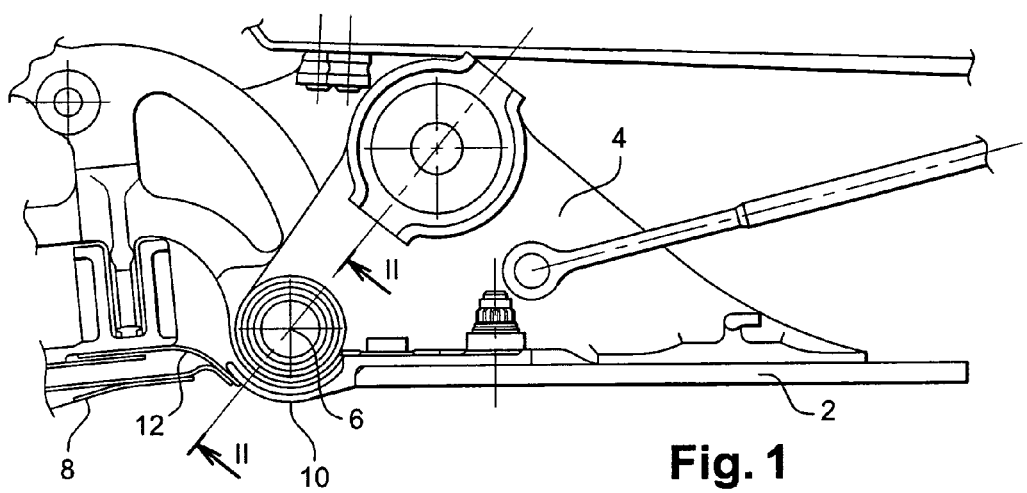
FIG. 1 is a diagrammatic and fragmentary axial-section view of a convergent turbojet exhaust nozzle.

Reference is made firstly to FIG. 1 which is a diagrammatic side view showing a controlled flap of a convergent exhaust nozzle at the outlet from an afterburner channel of a turbojet.

The controlled flap 2 is carried by a support part 4 connected to drive means, so as to pivot about an axis 6 at its upstream end, at the outlet from the afterburner channel 8.

The upstream end 10 of the controlled flap 2 bears against a peripheral sealing gasket 12 of the sealing-lip type, so that the hot gas leaving the afterburner channel 8 flows inside the exhaust nozzle formed by the flaps.

In known manner, the flaps of the convergent exhaust nozzle arranged at the outlet from the afterburner channel 8 comprise controlled flaps 2 disposed in alternation with follower flaps that are not connected directly to drive means, but which follows the movement of the controlled flaps 2.

When the flaps are made of metal, the junctions between adjacent flaps at their upstream ends 10 that bear against the peripheral sealing gasket 12 can be relatively leaktight, it being possible for the lateral edges of the controlled flaps and of the follower flaps to be shaped with small radii of curvature so that they can fit against one another to create very small leakage sections, thereby guaranteeing that the afterburner gas is properly guided into the exhaust nozzle formed by the flaps.

It has already been proposed to make the flaps out of a material that withstands the high temperatures of afterburner gas better than steel, and in particular to make them out of a material of the ceramic-matrix composite (CMC) type, said flaps being lighter than metal flaps, but being thicker because they are built up by superposing fiber sheets.

Figure 2:
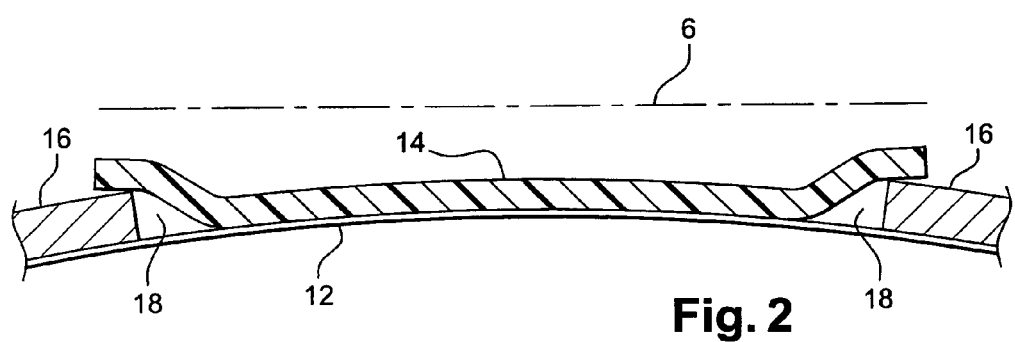
FIG. 2 is a larger-scale fragmentary section view on line II-II in FIG. 1.
Figure 3:
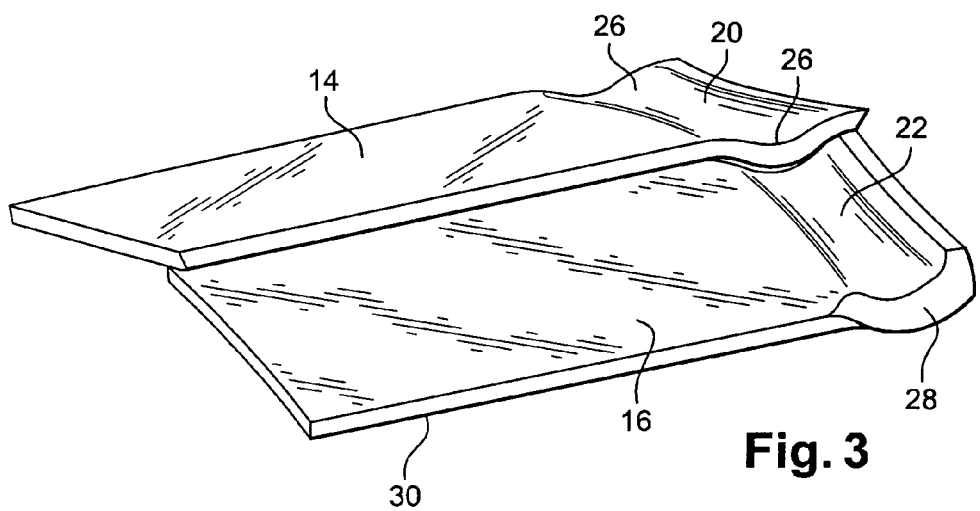
FIG. 3 is a diagrammatic, perspective view of a controlled flap and of a follower flap of the invention.
Figure 4:
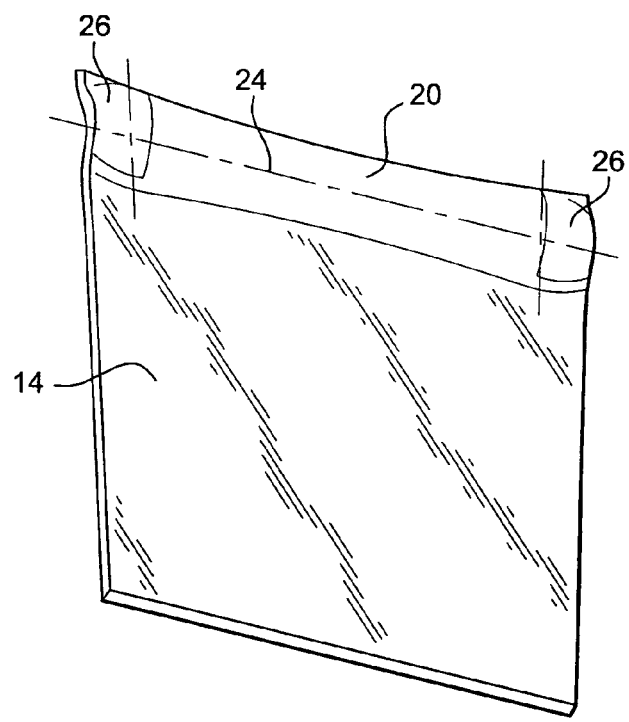
FIG. 4 is a diagrammatic, perspective view of a controlled flap as seen from below.
Figure 5:
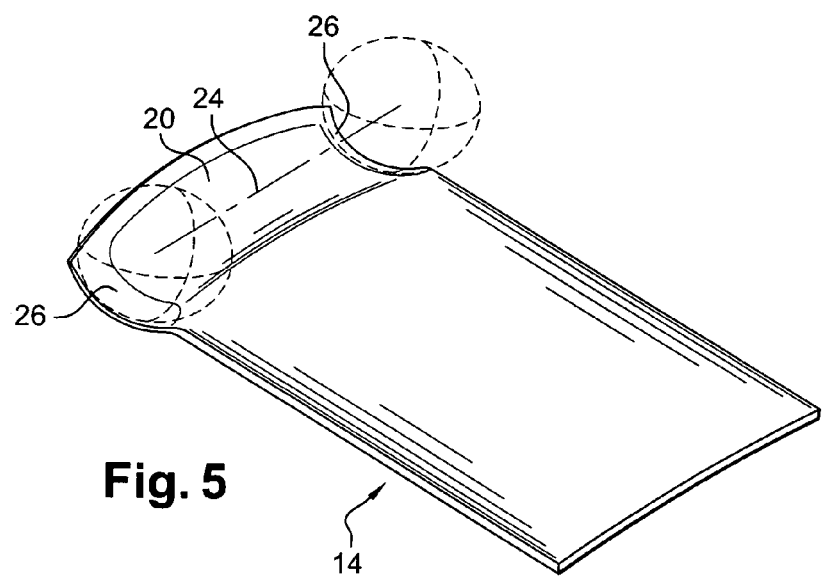
FIG. 5 is a diagrammatic view in perspective and from below of a follower flap.

As shown in FIG. 2, a further consequence of this structure is that the leakage sections 18 between the upstream ends of the controlled flaps 14 and of the follower flaps 16, at the peripheral gasket 12, are relative large, essentially because of the relative large radius of curvature required by the lateral edges of the CMC flaps in their overlapping zones.

Typically, the radius of curvature is about 10 millimeters (mm) when the thickness of the CMC flap is about 5 mm, whereas it is less than 1 mm for a metal flap.

In particular, the invention enables this problem to be solved by eliminating the large leakage sections 18 in the upstream overlapping zones of the controlled flaps 14 and of the follower flaps 16 made of CMC of a convergent exhaust nozzle at the outlet from an afterburner channel of a turbojet.

To do this, and as shown diagrammatically in FIGS. 3 to 6, each of the controlled and follower flaps 14 and 16 is made as a single piece out of CMC, and has an upstream end 20 or 22 that is substantially rounded so as to form one-fourth of a cylinder having a transverse axis 24 that coincides with the pivot axis 6 of the flap when said flap is mounted at the outlet from the afterburner channel 8, as shown in FIG. 1.

The lateral ends of said cylindrical rounded portion 20, 22 are formed by respective spherical portions 26 and 28, that are centered on the axis 24 of the cylindrical rounded portion 20, 22.

When the flaps are in place, the concave sides of the cylindrical portions 20, 22 and of the spherical portions 26, 28 face outwards away from the axis of the turbine, so that the rounded surfaces of the upstream ends of the flaps which bear against the peripheral gasket 12 are convex, and so that the spherical portions 26 of the upstream ends of the controlled flaps 14 form balls that are received in spherical socket portions formed by the spherical portions 28 of the upstream ends 22 of the follower flaps 16.

Figure 6:
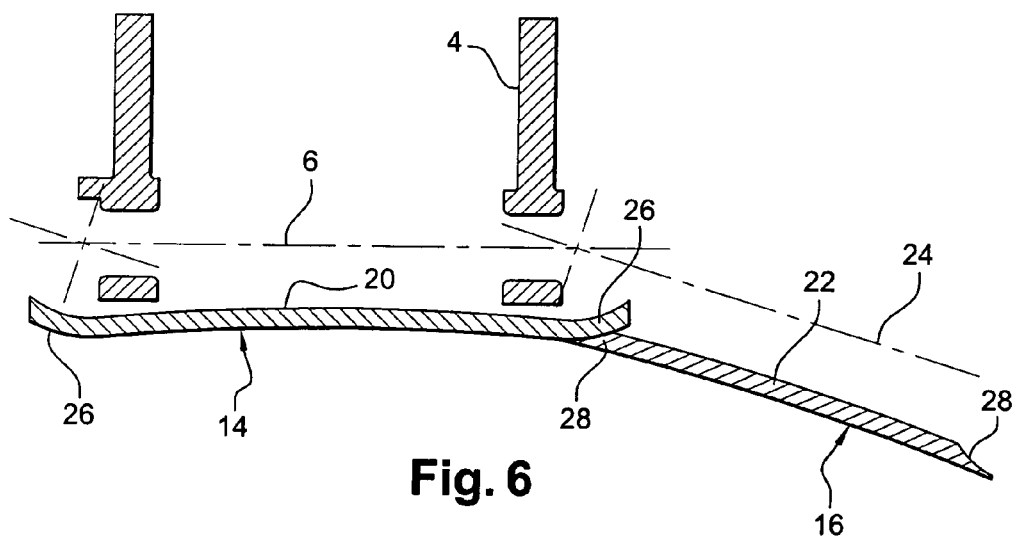
FIG. 6 is a diagrammatic and fragmentary cross-section view of the upstream ends of two flaps of the invention.

By means of this characteristic, the leakage sections in the overlapping zones of the controlled and follower flaps 14 and 16, at the peripheral gasket 12 at the outlet from the afterburner channel, are substantially eliminated, as shown diagrammatically in FIG. 6.

The longitudinal sealing between the controlled flaps 14 and the follower flaps 16 is provided by the longitudinal edges 30 of the follower flaps 16 bearing against the inside faces of the controlled flaps 14. For improved sealing, the longitudinal edges 30 of the follower flaps 16 can be machined. This enables the desired shapes to be achieved with good precision, but this presents the drawback of cutting the ceramic fibers, thus resulting in ends that are visible on the machined faces of the flaps, and that are liable to cause the portions of the other flaps against which they bear to wear rather quickly.

Figure 7:
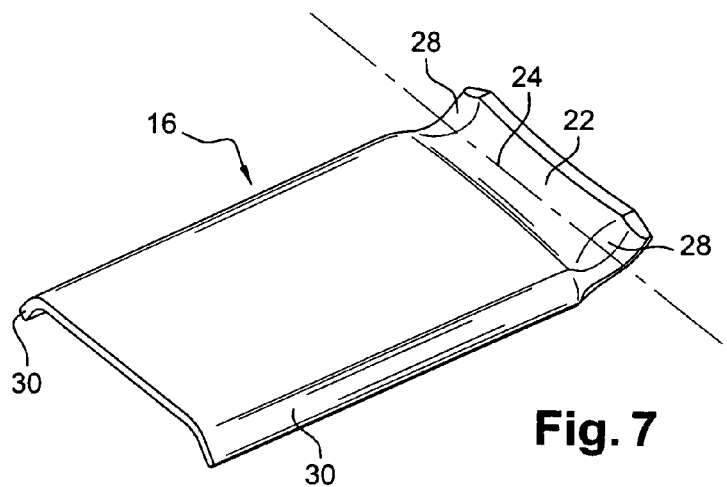
FIG. 7 is a diagrammatic, perspective view of a variant embodiment of a follower flap of the invention.
Figure 8:
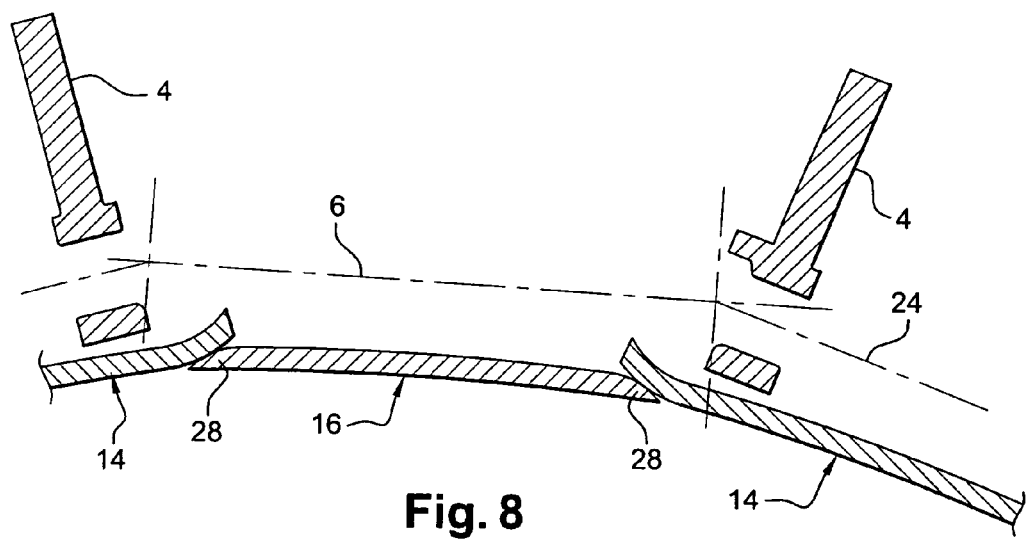
FIG. 8 is a diagrammatic and fragmentary cross-section view of the upstream ends of the flaps of the FIG. 7 variant embodiment of the invention.

In order to avoid that drawback, the flaps are not machined, but the longitudinal edges 30 of the follower flaps 16 are shaped by folding, so as to form a convex rounded shape, as shown in FIGS. 7 and 8.

The convex rounded surfaces 30 of the follower flaps 16 that bear against the inside faces of the controlled flaps 14 do not have ceramic-fiber ends that are liable to attack the inside faces of the controlled flaps 14.

Advantageously, the cylindrical rounded portions 22 of the follower flaps 16 and their spherically-shaped ends 28 are also made by forming, without machining, like the cylindrical portions 20 of the controlled flaps 14 and their spherically-shaped ends 26.

The contacting portions of the flaps can be given an anti-abrasion coating, in particular when these portions are made by machining.

The peripheral sealing gasket 12 mounted at the outlet from the afterburner channel 8 could also be made out of CMC, so as to reduce wear in the rubbing zones on the upstream ends of the controlled flaps and of the follower flaps.

What is claimed is:

1. A convergent turbojet exhaust nozzle comprising a ring of hinged flaps made up of controlled flaps and of follower flaps disposed in alternation and co-operating at their upstream ends with a peripheral sealing gasket arranged at the outlet from an afterburner channel, wherein each flap is made out of a ceramic-matrix composite material, and each flap is made integrally with bearing means at its upstream end for bearing against the above-mentioned peripheral gasket, and with sealing means providing longitudinal sealing between flaps, and wherein each flap is also made integrally at its upstream end with spherical-joint means pivotally connected to the upstream ends of the adjacent flaps.

2. A convergent exhaust nozzle according to claim 1, wherein the upstream end of each flap includes a circularly-cylindrical portion that is oriented transversely relative to the axis of the exhaust-nozzle, and tangentially relative to the peripheral gasket, and having a convex cylindrical surface that bears against the peripheral gasket.

3. A convergent exhaust nozzle according to claim 2, wherein the concave side of the circularly-cylindrical portion faces outwards away from the axis of the exhaust nozzle.

4. A convergent exhaust nozzle according to claim 2, wherein the lateral ends of the circularly-cylindrical portion are shaped into spherical portions and form hinge means pivoted on the adjacent flaps.

5. A convergent exhaust nozzle according to claim 4, wherein the spherical portions have concave sides that face outwards away from the axis of the exhaust nozzle.

6. A convergent exhaust nozzle according to claim 4, wherein the spherical portions formed at the upstream ends of the controlled flaps form balls that are received in sockets formed by the spherical portions of the upstream ends of the follower flaps.

7. A convergent exhaust nozzle according to claim 4, wherein the centers of the spherical portions are situated on the axes of the cylindrical portions of the upstream ends of the flaps.

8. A convergent exhaust nozzle according to claim 1, wherein longitudinal sealing between the flaps is achieved by the controlled flaps bearing against the longitudinal edges of the follower flaps, the longitudinal edges having a convex curved shape in cross-section.

9. A convergent exhaust nozzle according to claim 4, wherein the circularly-cylindrical portions and the spherical portions of the upstream ends of the flaps are made by molding or shaping, without machining.

10. A convergent exhaust nozzle according to claim 4, wherein the spherical portions of the upstream ends of the follower flaps and their longitudinal edges of convex cross-section are made by machining.

11. A convergent exhaust nozzle according to claim 4, wherein the spherical portions of the upstream ends of the follower flaps and their longitudinal edges of convex cross-section are made by folding and forming, without machining.

12. A convergent exhaust nozzle according to claim 1, wherein the peripheral sealing gasket is made out of ceramic-matrix composite material.

13. A convergent exhaust nozzle according to claim 1, wherein the flaps are coated at least part in an anti-abrasion coating at their upstream ends and along their longitudinal edges.

14. A convergent turbojet exhaust nozzle comprising a ring of hinged flaps made up of controlled flaps and of follower flaps disposed in alternation and co-operating at their upstream ends with a peripheral sealing gasket arranged at the outlet from an afterburner channel, wherein each flap is made out of a ceramic-matrix composite material, and each flap is made integrally with bearing means at its upstream end for bearing against the above-mentioned peripheral gasket, and with sealing means providing longitudinal sealing between flaps, wherein the upstream end of each flap includes a circularly-cylindrical portion that is oriented transversely relative to the axis of the exhaust-nozzle, and tangentially relative to the peripheral gasket, and having a convex cylindrical surface that bears against the peripheral gasket, and wherein the lateral ends of the circularly-cylindrical portion are shaped into spherical portions and form hinge means pivoted on the adjacent flaps.

15. A convergent exhaust nozzle according to claim 14, wherein the spherical portions have concave sides that face outwards away from the axis of the exhaust nozzle.

16. A convergent exhaust nozzle according to claim 14, wherein the spherical portions formed at the upstream ends of the controlled flaps form balls that are received in sockets formed by the spherical portions of the upstream ends of the follower flaps.

17. A convergent exhaust nozzle according to claim 14, wherein the centers of the spherical portions are situated on the axes of the cylindrical portions of the upstream ends of the flaps.

\* \* \* \* \*